United States Patent

Kawamura

Patent Number: 5,727,519
Date of Patent: Mar. 17, 1998

[54] LOW EVAPORATIVITY FUEL DIESEL ENGINE

[75] Inventor: Hideo Kawamura, Samukawa-machi, Japan

[73] Assignee: Isuzu Ceramics Research Institute Co., Ltd., Kanagawa-ken, Japan

[21] Appl. No.: 796,367

[22] Filed: Feb. 6, 1997

[30] Foreign Application Priority Data

May 24, 1996 [JP] Japan .................. 8-151910
May 24, 1996 [JP] Japan .................. 8-151911

[51] Int. Cl.⁶ .................. F02B 19/00
[52] U.S. Cl. .................. 123/262; 123/299
[58] Field of Search .................. 123/262, 276, 123/260, 254, 261, 279, 304, 299

[56] References Cited

U.S. PATENT DOCUMENTS

| | | | |
|---|---|---|---|
| 2,692,587 | 10/1954 | Barber | 123/304 |
| 4,446,830 | 5/1984 | Simko et al. | 123/276 |
| 5,081,970 | 1/1992 | Matsuoka | 123/275 |
| 5,425,337 | 6/1995 | Matsuoka | 123/262 |
| 5,483,933 | 1/1996 | Kawamura | 123/254 |
| 5,515,823 | 5/1996 | Kawamura | 123/262 |

FOREIGN PATENT DOCUMENTS 9217624 8/1997 Japan .................. F02B 19/02

*Primary Examiner*—Willis R. Wolfe
*Assistant Examiner*—Hieu T. Vo
*Attorney, Agent, or Firm*—Browdy and Neimark

[57] ABSTRACT

A diesel engine using a low evaporativity fuel, and improves the fluidity of the air and fuel by injecting the fuel into a cylinder at the beginning of a compression stroke forming a uniform gaseous mixture, whereby the generation of $NO_x$ is minimized. A swirl chamber is formed in a piston, and a primary chamber by a combustion chamber structure provided in a cavity of a cylinder head. A fuel injection nozzle injects a low evaporativity fuel, such as heavy oil, into the cylinder at the beginning of a compression stroke, disperses the fuel into an air swirl in the cylinder, forms a uniform gaseous mixture of the fuel and air therein, and ignites and burns with the assistance of a glow plug the gaseous mixture entering the swirl chamber through communication ports at the end of the compression stroke. In another embodiment, the piston is provided with a plurality of radially arranged communication ports and a downwardly convergent fuel injection port, and a fuel injection nozzle injects a low evaporativity fuel into a cylinder at the beginning of a compression stroke, disperses the fuel into an air swirl in the cylinder, forms a uniform gaseous mixture of the fuel and air in the cylinder, and ignites and burns the gaseous mixture in the swirl chamber by reliably supplying an ignition fuel thereto through the fuel injection port at the terminal end of the compression stroke.

9 Claims, 5 Drawing Sheets

LOW EVAPORATIVITY FUEL DIESEL ENGINE

BACKGROUND OF THE INVENTION

1. Field of the Invention

This invention relates to a low evaporativity fuel diesel engine applied to a cogeneration system and having a swirl chamber in a piston.

2. Description of the Prior Art

In general, gasoline, light oil and heavy oil are used as fuels for an engine. In a conventional diesel engine, light oil is burnt as a fuel in a combustion chamber. The cetane value of the light oil is not lower than 40, while that of the heavy oil is as low as around 25. The evaporativity of the gasoline, light oil and heavy oil is high, low and substantially zero respectively. The prices of the light oil and heavy oil are around 70 and 15 respectively based on, for example, 100 representing the price of the gasoline.

The conventional generating equipment comprising a cogeneration system is in most cases a system having a generator mounted on an engine. In the generation of power using a diesel engine, the fuel cost increases since the diesel engine uses light oil as a fuel, the fuel cost becoming higher than the cost of the electric power supplied from an electric company. Therefore, the superiority concerning the cost cannot be secured. The obtaining of electric power by an engine using gasoline costs excessively high cost, and there are no measures to be taken to deal with this problem. When gasoline or light oil is used as a fuel for a cogeneration engine, the fuel cost becomes high, so that a natural gas has come to be used as a fuel for such an engine.

The inventor of the present invention developed a diesel engine using heavy oil as a fuel, and filed previously Japanese Patent Application No. 46956/1996 for the product. This diesel engine is capable of igniting and burning heavy oil as a fuel of a high viscosity and no evaporativity without subjecting it to high-pressure injection, and provided with a primary chamber and a swirl chamber in a cylinder head and a fuel injection nozzle in the vicinity of communication ports, the fuel being injected from the fuel injection nozzle toward seat portions of switch valves, which are provided in the communication ports, immediately after the switch valves are opened, so as to entrain the fuel in a high-speed air flow passing through the communication ports, whereby the fuel is dispersed into the air flow between the primary chamber and swirl chamber, gasified and diffused, and ignited and burnt.

Since an engine used for a cogeneration system requires a high thermal efficiency and a high degree of cleanness of an exhaust gas, the light oil having an excellent ignitability is used as a fuel in most cases. However, since the light oil is used as a fuel for vehicles in many cases, the supply-demand relation of the light oil is not always good. There is a conventional practically-used cogeneration engine using a natural gas but even a natural gas causes the fuel cost to increase. Moreover, it is difficult to obtain the supply of a natural gas in some districts.

Under the circumstances, it is demanded that a diesel engine not using light oil and natural gas as a fuel but using heavy oil as a fuel of a lower price and a lower evaporativity be developed. However, when a low evaporativity fuel, such as heavy oil is used for this engine, various problems including problems concerning the occurrence of soot and $NO_x$ arise. Consequently, it is necessary to develop a fuel system solving these problems and using as a fuel a fire-resistant low evaporativity fuel, such as heavy oil.

When a fuel is injected into a high-temperature atmosphere in a combustion chamber of a heat insulating structure in a diesel engine using a low evaporativity fuel, such as heavy oil as a fuel, the mixing of the air with the fuel is not done sufficiently, i.e., an ununiform gaseous mixture is produced. In such an atomized fuel, a local high-temperature portion occurs in an outer circumferential part thereof due to ununiform flames, and a large amount of $NO_x$ occurs. Since the viscosity of the fuel is high in this diesel engine, an injection pump requiring a large compressive force cannot be used, and forming an atomized fuel under a high pressure in a combustion chamber is difficult. Moreover, the mixing of the air with the fuel is poor, and HC and soot occur in large quantities. In order to increase the pressure of the heavy oil of a high viscosity, a fuel injection pump of larger size is required but, when a fuel injection pump of a higher injection pressure is used, the cost of the pump increases.

In a low-speed diesel engine for ships, the rotational frequency is sufficiently low, i.e., not more than 100–200 rpm, so that a sufficiently long time can be spent for mixing the air with a fuel. In this engine, a fuel is sprayed from a fuel injection nozzle under a high pressure in the radial direction toward the periphery of a cylinder to form a uniform gaseous mixture of the fuel and burn the same mixture. Although the fuel efficiency of this engine is satisfactory, a critical problem of the occurrence of HC and $NO_x$ arises.

However, in a diesel engine operated at a high speed (for example, 1500 rpm), such as a cogeneration engine, the time for mixing the air with a fuel is short and not sufficiently long. Therefore, a misfire occurs, and the generation of $NO_x$ and smoke is encountered many times. Therefore, this diesel engine has a problem of developing the techniques for forming an excellent and uniform gaseous mixture so as to improve the fuel efficiency, especially, a problem of developing the techniques for reducing the generation of $NO_x$ and smoke.

Therefore, in order to improve a combustion, increase a thermal efficiency and attain the cleaning of an exhaust gas in a diesel engine using a fire-resistant low evaporativity fuel, such as heavy oil, it is necessary to reduce a combustion period and form a uniform gaseous mixture by mixing a fuel with the air excellently. In a diesel engine using a heat resisting material, such as a ceramic material as a structural material for a combustion chamber, the temperature at a compression end in a combustion chamber increases to not lower than 250° C. to form a high-temperature atmosphere. When a low evaporativity fuel, such as heavy oil is injected into such a high-temperature atmosphere in a heat insulating type diesel engine, the air and fuel are not satisfactorily mixed, and a local high-temperature portion is formed in an outer circumferential part of the atomized fuel due to ununiform flames, so that $NO_x$ occurs in large quantities. In order to reduce the generation of $NO_x$ and soot in a diesel engine, a lean gaseous mixture is desirably formed but, when a lean gaseous mixture is formed, a misfire occurs to cause a large quantity of HC to be generated.

Therefore, in order to burn a low evaporativity fuel, such as heavy oil, it is conceivable to carry out a method of spending much time in gasifying the fuel, or a method of utilizing kinetic energy by promoting the mixing of the air and fuel with each other, or a method of increasing the temperature of the air. In a high-speed diesel engine using a low-quality fuel, such as heavy oil, it is difficult to mix the fuel with the air. Accordingly, the performance of such an engine is low, and noxious substances, such as $NO_x$ and soot are contained in the exhaust gas. In order to mix the fuel with the air excellently and improve the performance of the engine, the fuel and air have to be brought into contact with each other effectively. The conceivable methods of effectively mixing a low-quality fuel, such as heavy oil with air and effectively burning the mixture include a method of increasing the time for mixing the fuel with air, a method of increasing the temperature of the air, and a method of promoting the mixing of the air with the fuel by utilizing the kinetic energy of the air.

In an engine having a combustion chamber of a heat insulating structure, the suction air receives the heat from the wall surface of the combustion chamber and is heated therewith, so that the fuel is gasified efficiently. Therefore, if a combustion chamber is formed to a heat insulating structure so as to improve the fluidity of the air and fuel therein, a low-evaporativity fuel, such as heavy oil can be burnt. The $NO_x$, a noxious substance in an exhaust gas tends to be generated in large quantities when fuel particles react with the ambient air during the combustion of a particulates fuel in the air. However, when a combustion reaction is generated with a fuel dispersed in the air, the combustion of the fuel is controlled by the temperature of the air on the outer side of the fuel, and a large temperature rise does not occur, so that the generation of $NO_x$ is minimized.

SUMMARY OF THE INVENTION

An object of the present invention is to provide a diesel engine using a low-evaporativity fuel, developed so as to solve these problems, adapted to be rotated at a high speed by using a low evaporativity fuel, such as heavy oil, and characterized by increasing the temperature of the air supplied to the interior of a combustion chamber, forming the combustion chamber to a heat insulating structure by using a heat resisting material, such as a ceramic material as a structural material, spending a sufficiently long time for the mixing of the air with a fuel, injecting the fuel into the combustion chamber at an end of a suction stroke or at least in the first half of a compression stroke, injecting the fuel into a suction air swirl in a region in which the air pressure is low with a piston positioned at a bottom dead center, so as to utilize the fluidity of the air in the mixing of the air with the fuel, improving the fluidity of the air and fuel by dispersing the fuel into an air flow in a cylinder, whereby a uniform gaseous mixture is formed, introducing the particles of imperfectly mixed fuel from a primary chamber into a swirl chamber through communication ports, whereby the mixing of the fuel with the air is promoted, igniting and burning the gaseous mixture in the swirl chamber so as to minimize the generation of $NO_x$ and smoke, and injecting an ignition fuel again from a fuel injection nozzle into the swirl chamber and igniting and burning the fuel so as to prevent a misfire when the engine is in a partial load condition.

The present invention relates to a diesel engine using a low evaporativity fuel, comprising a cylinder head fixed on a cylinder block constituting a cylinder, a combustion chamber structure forming a heat insulating primary chamber provided in a cavity formed in the cylinder head, valves adapted to open and close ports formed in the cylinder head, a fuel injection nozzle adapted to inject a low evaporativity fuel into the cylinder provided in the cylinder head, a glow plug provided in the cylinder head, a piston adapted to be moved reciprocatingly in the cylinder, forming a heat insulating swirl chamber therein and provided with a communication port through which the primary chamber and swirl chamber communicate with each other, and a plug insert bore through which the glow plug is thrusted into the swirl chamber when the piston is in the vicinity of a top dead center thereof, and a controller adapted to control the injection of the fire-resistant low evaporativity fuel from the fuel injection nozzle into the primary chamber in the first half of a compression stroke and the injection of a part of the fuel into the swirl chamber at an end of a compression stroke in which the glow plug is thrusted into the swirl chamber through the plug insert bore, whereby the fuel is ignited and burnt in the swirl chamber.

In the primary chamber, the suction air introduced from the ports into the cylinder forms a swirl therein. The atomized fuel from the fuel injection nozzle is injected into the cylinder diagonally from the center of the cylinder toward the periphery thereof, and dispersed into a swirl in the cylinder.

The controller is adapted to control the reinjection of the fuel from the fuel injection nozzle into the swirl chamber through a fuel injection port formed in the piston, which injection is carried out in response to the partial load condition of the engine. Namely, when a load on this diesel engine is small, it is difficult that the ignition and combustion of the fuel be carried out reliably. Therefore, the fuel is injected again from the fuel injection nozzle into the swirl chamber when the piston is in a position in the vicinity of the compression top dead center of the piston, and, moreover, the reinjected fuel is dashed against the glow plug projected into the interior of the swirl chamber and thereby heated, the fuel being thus ignited and burnt reliably.

In this diesel engine, the spraying of the fuel into the cylinder is done when the piston is in a position in the vicinity of the bottom dead center of the piston in a substantially initial period of a compression stroke as mentioned above, and the fuel is injected from the fuel injection nozzle into a flow of a suction air swirl in the cylinder so as to disperse the fuel into the air flow, whereby an imperfect but excellent gaseous mixture is formed. This gaseous mixture is introduced at a high speed into the centrally provided swirl chamber through the communication port and plug insert bore in accordance with an upward movement of the piston, whereby a mixing operation in the swirl chamber is promoted to form a uniform gaseous mixture, the fuel injected into the swirl chamber through the through port in a position in the vicinity of the end of a compression stroke being ignited and burnt in the swirl chamber with the assistance of the glow plug to enable the generation of $NO_x$ and smoke to be reduced, and an ideal combustion to be effected. Moreover, the injection of the atomized fuel is carried out diagonally from the center of the cylinder toward the periphery thereof, so that the dispersion of the fuel into the air in the cylinder is carried out excellently.

Since this diesel engine is constructed as described above, a low evaporativity fuel, such as heavy oil is sprayed widely into the air flow in the cylinder from substantially the center of the cylinder toward the periphery thereof, whereby the mentioned fuel is diffused and dispersed uniformly in the primary chamber. Thus, a uniform gaseous mixture of the fuel and the air can be formed in the primary chamber. The gaseous mixture entering the swirl chamber from the primary chamber and through the communication port when the piston is in the vicinity of the compression top dead center then impinges upon the glow plug, and is ignited and burnt reliably in the swirl chamber, the combustion of the gaseous mixture being carried out with the generation of $NO_x$ minimized. In the next expansion stroke, the uniform gaseous mixture which has already been formed in the primary chamber is burnt by the flames, which serve as a fire source, dispersed and injected uniformly and in the circumferential direction from the swirl chamber into the primary chamber. Therefore, ununiform flames do not occur in the primary chamber, and the combustion propagates speedily therein. Namely, a high-temperature region ascribable to ununiform flames does not occur in the circumferential portion of the sprayed fuel, and the gaseous mixture is not burnt at a high temperature. Accordingly, the generation of $NO_x$ is minimized, and the combustion is completed in a short period of time.

When this diesel engine is partially loaded, the gaseous mixture flowing into the swirl chamber is lean, and a misfire would occur. Therefore, an ignition fuel is injected from the fuel injection nozzle into the swirl chamber so as to ignite and burn the gaseous mixture reliably. Namely, when a very small amount of fuel is injected into the swirl chamber formed in the piston, at the time at which the piston is in the vicinity of the compression upper dead center, the gaseous mixture can be ignited reliably even when the engine is partially loaded, and a misfire does not occur. Since a uniform gaseous mixture is formed, a high-speed operation of the engine can be attained.

Since this diesel engine enables a high-speed operation to be carried out, the occurrence of $NO_x$ to be reduced, an exhaust gas to be cleaned, and, moreover, the ignitability of a gaseous mixture and the thermal efficiency to be improved in spite of the fact that a low evaporativity fuel, such as inexpensive heavy oil is used as a fuel as mentioned above, it is very preferably applied to a cogeneration system used for a generation system.

An object of the present invention is to provide a diesel engine using a low-evaporativity fuel, wherein a low evaporativity fuel, such as heavy oil is injected at a wide angle into a suction air swirl in a region of a low air pressure with the piston in the bottom dead center so as to increase the temperature of the suction air introduced into the combustion chamber, spend a sufficiently much time for the mixing of the fuel and air with each other and enable an air flow to be utilized, a lean gaseous mixture being formed by dispersing the widely injected fuel into an air flow in the cylinder and thereby promoting the mixing of the fuel with the air, the gaseous mixture being introduced at a high speed into the centrally positioned swirl chamber through a communication port in accordance with the upward movement of the piston to promote the mixing of the fuel with air and form a uniform gaseous mixture in the swirl chamber, an ignition fuel of a low evaporativity being then injected from a fuel injection nozzle into the swirl chamber through a convergent fuel injection port so that the fuel is collected together, an easily ignitable rich gaseous mixture being thus formed in the swirl chamber and ignited and burnt, whereby the occurrence of $NO_x$ and smoke is minimized.

This diesel engine has in the substantially central portion of the piston a fuel injection port formed so that the cross-sectional area thereof decreases gradually from a top surface of the piston toward the swirl chamber, and this fuel injection port can be formed by a fuel injection nozzle for injecting a low evaporativity fuel in a diffused state into the cylinder in the first half of a compression stroke, and an ignition low evaporativity fuel into the swirl chamber through the fuel injection port in the latter half of a compression stroke.

The wall surface of the injection port is provided with an ignition promoting catalyst layer of Pt, Ni or Cs. Accordingly, the fuel injected from the fuel injection nozzle into the swirl chamber through the fuel injection port is mixed with a high-temperature lean gaseous mixture to form an easily ignitable rich gaseous mixture, and, moreover, this gaseous mixture contacts the ignition promoting catalyst layer, so that it can be ignited reliably even when the temperature is low.

The fuel, not less than 50% of a total amount of which is injected from the fuel injection nozzle into the cylinder at the beginning of a compression stroke, is injected in a diffused state from the center of the cylinder toward the periphery of the top surface of the piston, and the remaining atomized ignition fuel injected at the terminal end of a compression stroke is collected in the fuel injection port, receives heat from the wall surface of the fuel injection port and is inject-into the swirl chamber.

In this diesel engine, a low evaporativity fuel is injected in a diffused state from the fuel injection nozzle into the cylinder, and then an ignition low evaporativity fuel from the top surface of the piston into the swirl chamber through the fuel injection port, which is provided in the substantially central portion of the piston so that the cross-sectional are thereof decreased gradually from the top surface of the piston toward the swirl chamber, and ignited and burnt therein as mentioned above. Accordingly, a substantially uniform gaseous mixture is formed in the cylinder, and it enters the swirl chamber in accordance with the upward movement of the piston and through the communication port and fuel injection port. The mixing of the resultant gaseous mixture is promoted in the swirl chamber, and the gaseous mixture is ignited and burnt by injecting the ignition low evaporativity fuel into the swirl chamber through the fuel injection port when the piston is in a position in the vicinity of the terminal end of a compression stroke. Thus, an ideal combustion of a gaseous mixture having a low generation rate of $NO_x$ can be carried out.

In this diesel engine, the atomized fuel is conically diffuse-injected from the fuel injection nozzle into the cylinder in the first half of a compression stroke so that the fuel is directed from the center of the cylinder toward the periphery thereof. Therefore, the low evaporativity fuel is dispersed excellently into the air in the cylinder, and a uniform gaseous mixture is formed therein.

Since this diesel engine is constructed as described above, a low evaporativity fuel, such as heavy oil is injected in a wide range into the air flow in the cylinder so that the fuel is conically expanded from the substantially central portion of the cylinder toward the periphery thereof and over the whole region of the top surface of the piston, in the first half of a compression stroke, i.e., in a stage in which the pressure in the cylinder is low. Consequently, the low evaporativity fuel is uniformly diffused and dispersed in the primary chamber, and a uniform gaseous mixture of the fuel and air can be formed in the primary chamber. The gaseous mixture is then introduced in a compression stroke from the primary chamber into the swirl chamber through the communication port and fuel injection port and further mixed therein. An ignition fuel is injected from the fuel injection nozzle into the swirl chamber through the fuel injection port when the piston is in the vicinity of the terminal end of a compression stroke, and ignited and burnt reliably with the generation of $NO_x$ minimized. In the subsequent expansion stroke in which a uniform gaseous mixture has already been formed in the primary chamber, the flames injected in a uniformly dispersed state from the swirl chamber into the primary chamber in the circumferential direction thereof serve as fire sources, so that ununiform flames do not occur in the primary chamber, the propagation of combustion in the primary chamber proceeds speedily. Accordingly, a local high-temperature region, which is ascribable to ununiform flames, does not occur in the outer circumferential portion of the injected atomized fuel. Since the gaseous mixture is not burnt at a high temperature, the occurrence of $NO_x$ is minimized, and the combustion can be completed in a short period of time.

In spite of the fact that this diesel engine uses a low evaporativity fuel, such as inexpensive heavy oil, it can be operated at a high speed, and the occurrence of $NO_x$ is minimized, the exhaust gas being cleaned. Moreover, the ignitability of the gaseous mixture is excellent, and the thermal efficiency is improved. Therefore, this diesel engine is preferably applied to an installed type cogeneration system used for a generation system. In a cogeneration system, the rotational frequency of and a load on the engine are substantially constant, so that it is easy to set to a predetermined level the time at which the fuel is injected into the primary chamber. Especially, since the formation of $NO_x$ can be minimized, and, since a low evaporativity fuel, such as heavy oil can be used as a fuel, the fuel consumption can be reduced.

DESCRIPTION OF THE PREFERRED EMBODIMENTS:

The embodiments of the diesel engine using a low evaporativity fuel according to the present invention will now be described with reference to the drawings.

The diesel engine according to the present invention is a combustion system capable of using a fire-resistant low evaporativity fuel, such as heavy oil, and an engine preferably used as, for example, an installed type cogeneration engine, and it is operated by sequentially repeating four strokes, i.e. suction stroke, compression stroke, expansion stroke and exhaust stroke.

Figure 1:
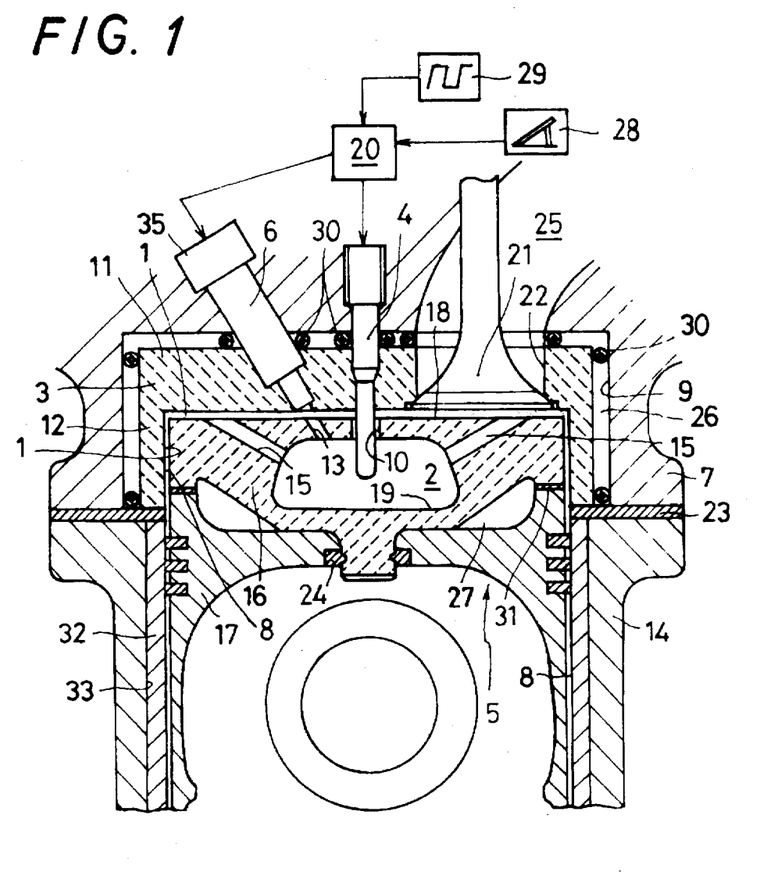
FIG. 1 is a sectional view showing the condition, in which a piston is in a top dead center, of a first embodiment of the diesel engine using a low evaporativity fuel according to the present invention.
Figure 2:
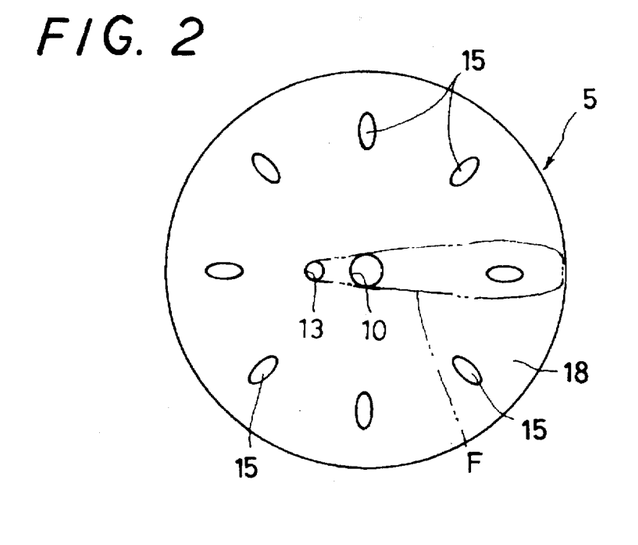
FIG. 2 is a plan view showing an upper surface of the piston in the diesel engine using a low evaporativity fuel of FIG. 1.
Figure 3:
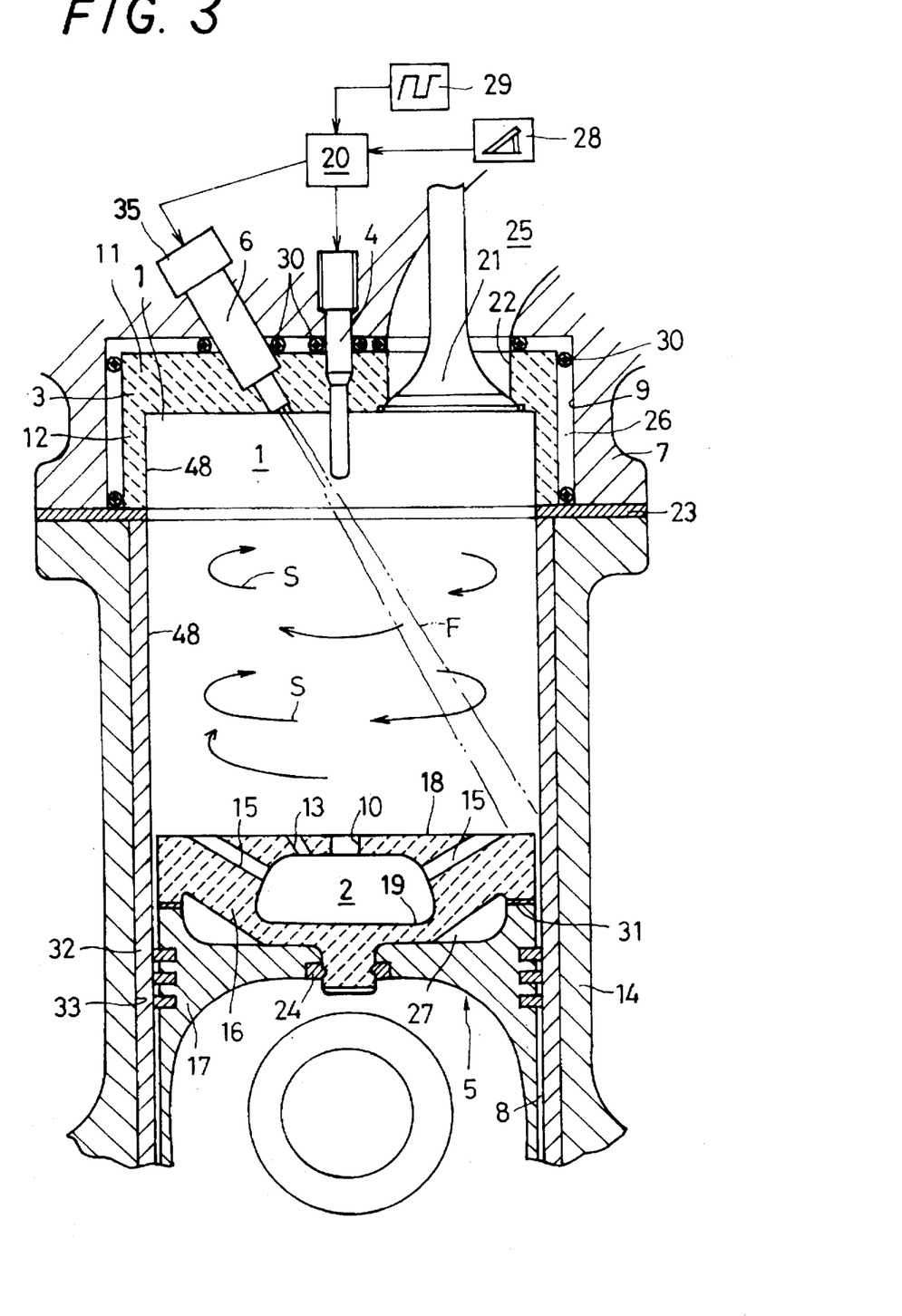
FIG. 3 is a sectional view showing the condition, in which the piston is in the vicinity of a bottom dead center, of the diesel engine using a low evaporativity fuel of FIG. 1.

First, a first embodiment of the diesel engine according to the present invention will now be described with reference to FIGS. 1, 2 and 3.

In the diesel engine of the first embodiment, a cylinder head 7 is fixed on a cylinder block 14 via a gasket 23, and a combustion chamber structure 3 constituting a primary chamber 1 of a heat insulating structure is provided in a cavity 9 of the cylinder head 7. This diesel engine has a cylinder liner 32 forming a cylinder 8 fitted in a bore 33 formed in the cylinder block 14, and a piston 5 reciprocatingly moved in the cylinder 8 formed by the cylinder liner 32 and combustion chamber structure 3. The cylinder head 7 is provided therein with a fuel injection nozzle 6 for injecting a fuel into the primary chamber 1, and a glow plug 4.

The piston 5 is formed out of a ceramic material, such as silicon nitride having a high thermal resistance, and comprises a piston head 16 in which a combustion chamber of a heat insulating structure, or a swirl chamber 2, is formed and a piston skirt 17 fixed to the piston head via a connecting ring 24 by a metal flow. The piston head 16 has a cavity 19 forming a swirl chamber 2. The piston head 16 is further provided with communication ports communicating the primary chamber 1 and swirl chamber 2 with each other, a plug insert bore 10 through which the glow plug can be thrusted into the swirl chamber 2 when the piston is in the vicinity of a top dead center, and a fuel injection port 13 through which a fuel can be injected into the swirl chamber 2. As shown in FIG. 2, the communication ports 15 are provided plurally (8 in FIG. 2) in an upper surface 18 of the piston head 16 so as to be opened therein in the circumferentially spaced manner. The plug insert bore 10 is formed in the substantially central portion of the upper surface 18 of the piston head 16. The fuel injection port 13 is formed in the upper surface 18 of the piston head 16 as shown in FIG. 2, so as to extend diagonally, i.e., in the direction in which an atomized fuel F from the fuel injection nozzle 6 impinges upon the glow plug 4.

The combustion chamber structure 3 is a head liner comprising a liner upper portion 12 constituting a part of the cylinder 8, and a head lower portion 11. The head lower portion 11 is provided with suction and exhaust ports 22 (suction port only is shown). The suction port 22 communicates with a suction port 25 formed in the cylinder head 7. The suction port 22 is provided therein with a suction valve 21, and the exhaust port an exhaust valve. Gaskets 30 are interposed between the surface of the cylinder head 7 which defines the cavity 9 and an outer surface of the combustion chamber structure 3, and a heat insulating air layer 26 is formed in the same space, the primary chamber 1 being formed to a heat insulating structure. A gasket 31 is interposed between the piston head 16 and piston skirt 17, and a heat insulating air layer 27 is formed between the piston head 16 and piston skirt 17, the swirl chamber 2 comprising the cavity 19 provided in the piston head 16 being formed to a heat insulating structure. The gaskets 30, 31 can fulfil the sealing and heat insulating functions.

The fuel injection nozzle 6 is provided in the cylinder head 7 so as to inject a low evaporativity fuel, such as heavy oil into the cylinder 8, and an ignition fuel into the swirl chamber 2 through the fuel injection port 13. This diesel engine has sensors, such as a load sensor 28 for measuring a fuel supply amount and detecting an engine load, and a rotation sensor 29 for detecting the rotational frequency of the engine. A controller 20 is formed so as to receive detected signals from these various kinds of sensors, attain the supplying of a suitable fuel corresponding to the operational condition of the engine to the primary chamber 1, control the fuel injection time in response to the detected signals, and improved the fuel efficiency. The fuel injection nozzle 6 has an electromagnetic driving unit 35 opened and closed, for example, by an electromagnetic force, and is formed so that the fuel injection time is determined by the controller 20 differently at the engine starting time and during a steady operation of the engine, or in accordance with the temperature in the combustion chamber, an engine load and the rotational frequency of the engine.

The combustion chamber structure 3, a wall structure for forming the primary chamber 1, and the cylinder liner 32 and piston head 16 are formed out of a ceramic material, such as silicon nitride or silicon carbide which has a high thermal resistance. Therefore, even when the gas temperature in the latter half of a combustion period becomes high, each structural part has sufficient thermal resistance and high-temperature strength and a low discharge rate of unburnt hydrogen carbide HC, and this enables an engine of a high efficiency to be formed.

In this diesel engine having the above-described construction, the controller 20 controls the injection of a low evaporativity fuel from the fuel injection nozzle 6 into the cylinder 8 in the first half of a compression stroke, and the ignition and combustion of the fuel in the swirl chamber 2 at the terminal end of the compression stroke at which the glow plug 4 has been thrusted into the swirl chamber 2 through the plug insert bore 10. The suction air introduced, when the suction valve 21 is opened, from the suction ports 22, 25 into the cylinder 8 flows so as to from swirls, i.e. air flows S in the cylinder 8, and the injection of the atomized fuel F from the fuel injection nozzle 6 is done into the air flows S when the piston is in the vicinity of the bottom dead center in an initial part of the compression stroke. This injection is carried out so that the fuel is dispersed in large quantities into a region in which the air flows S actively occur, and this enables a uniform gaseous mixture to be formed in the whole of the interior of the cylinder 8. During a compression stroke, the piston 5 is moved up, and the air in the cylinder is compressed to cause the temperature thereof to increase. The gasification of the fuel is promoted, and the fuel is dispersed substantially uniformly into the air flows S to form a gaseous mixture. This gaseous mixture enters the swirl chamber 2 through the communication ports 15 and plug insert bore 10, and the mixing operation is promoted in the swirl chamber 2. The mixing is further promoted in the swirl chamber 2, and the gaseous mixture is ignited and burnt reliably with the assistance of the glow plug 4 when the piston is in the vicinity of the terminal end of the compression stroke.

The controller 20 is also adapted to control in response to a partial load on the engine the injection of an ignition fuel from the fuel injection nozzle 6 into the swirl chamber 2 through the fuel injection port 13 formed in the piston 5. Accordingly, a low evaporativity fuel, such as heavy oil is injected from the fuel injection nozzle 6 into the cylinder 8 so as to be dispersed therein in the first half of a compression stroke in response to a partial load on the engine and by an instruction from the controller 20, and a very small quantity of ignition fuel is then injected into the swirl chamber 2 through the fuel injection port 13 for the purpose of igniting the gaseous mixture when the piston is in the vicinity of the top dead center of the compression stroke. In this embodiment, the fuel injection port 13 may comprise a small port of around several millimeters in diameter. The fuel injection nozzle 6 is formed so as to have a single port so that the fuel can be injected into the swirl chamber 2 through the fuel injection port 13.

A second embodiment of the diesel engine using a low evaporativity fuel according to the present invention will now be described with reference to FIGS. 4, 5 and 6.

In the diesel engine in the second embodiment, a cylinder head 47 is fixed on a cylinder block 54 via a gasket 63, and a combustion chamber structure 43 constituting a primary chamber 41 of a heat insulating structure is provided in a cavity 49 formed in the cylinder head 47. This diesel engine has a cylinder liner 72 constituting a cylinder 48 fitted in a bore 73 formed in the cylinder block 54, and a piston 45 reciprocatingly moved in the cylinder 48 formed by the cylinder liner 72 and combustion chamber structure 43. The cylinder head 47 is provided therein with a fuel injection nozzle 46 for injecting a fuel into the primary chamber 41. The combustion chamber structure 43 is provided with a downwardly divergent port 44 which is substantially coaxial with the primary chamber 43.

A piston 45 comprises a piston head 56 formed out of a ceramic material, such as silicon nitride of a high thermal resistance so as to form a combustion chamber 1 of a heat insulating structure with the combustion chamber structure 43, and a piston skirt 57 fixed to the piston head 56 via a connecting ring 64 by metal flow. The piston head 56 is provided with a cavity 59 constituting a swirl chamber 42. The piston head 56 is further provided with communication ports 55 communicating the primary chamber 41 and swirl chamber 42 with each other, and a fuel injection port 53 formed in the substantially central portion of the piston 45 and capable of injecting a fuel into the swirl chamber 42. As shown in FIG. 5, the communication ports 55 are formed plurally so that they are opened in a circumferentially spaced manner in a top surface 58 of the piston head 56. The fuel injection port 53 is defined by a curved or tapering surface so as to extend downwardly convergently so that the cross-sectional area of this port 53 gradually decreases from the top surface 58 of the piston head 56 toward the swirl chamber 42.

The combustion chamber structure 43 is a head liner comprising a liner upper portion 52 constituting a part of the cylinder 48, and a head lower portion 51. The head lower portion 51 is provided with suction and exhaust ports 62 (suction port only is shown). The suction port 62 communicates with a suction port 65 formed in the cylinder head 47, and the exhaust port (not shown) formed in the head lower portion 51 with an exhaust port formed in the cylinder head 47. The suction port 62 is provided with a suction valve 61, and the exhaust port an exhaust valve. Gaskets 70 are provided between the surface of the cylinder head 47 which defines the cavity 49 and an outer surface of the combustion chamber structure 43, and a heat insulating air layer 66 is formed in the same space, a combustion chamber 1 being formed to a heat insulating structure. A gasket 71 is interposed between the piston head 56 and piston skirt 57, and a heat insulating air layer 67 is formed between the piston head 56 and piston skirt 57, the swirl chamber 42 comprising the cavity 59 formed in the piston head 56 being formed to a heat insulating structure. The gaskets 70, 71 can fulfil the sealing and heat insulating functions.

The fuel injection nozzle 46 is provided in the cylinder head 47 so as to inject a low evaporativity fuel, such as heavy oil into the cylinder 48, and an ignition fuel into the swirl chamber 42 through the fuel injection port 53. The combustion chamber structure 43, a wall body forming the primary chamber 41, cylinder liner 72 and piston head 56 are formed out of a ceramic material, such as silicon nitride or silicon carbide having a high thermal resistance. Therefore, even when the gas temperature in the latter half of a combustion period becomes high, each structural part has sufficient thermal resistance and high-temperature strength and a low discharge rate of unburnt hydrogen carbide HC, and this enables an engine of a high efficiency to be formed.

The fuel injection nozzle 46 is formed so as to have, for example, a single injection port, and adapted to inject a low evaporativity fuel in a conically diffused state into the cylinder 48 toward the whole region of the top surface 58 of the piston. Accordingly, the fuel injection port 53 is formed in the substantially central portion of the piston 45 and defined by a curved or tapering surface so that the cross-sectional area of the port 53 becomes gradually smaller from the top surface 58 of the piston toward the swirl chamber 42 so as to enable an ignition low evaporativity fuel injected from the fuel injection nozzle 46 to be introduced smoothly into the swirl chamber through the fuel injection port 53. Accordingly, the injected atomized fuel F, the amount of which accounts for not less than 50% of that of a total fuel to be injected, from the fuel injection nozzle 46 into the cylinder 48 in an initial stage of a compression stroke is diffused from the center of the cylinder 48 toward the periphery of the top surface 58 of the piston, and the remaining ignition atomized fuel to be injected when the piston is in the vicinity of the terminal end of a compression stroke is collected in the fuel injection port 53, receives heat from the wall surface of the same port 53, and is injected into the swirl chamber 42.

Figure 6:
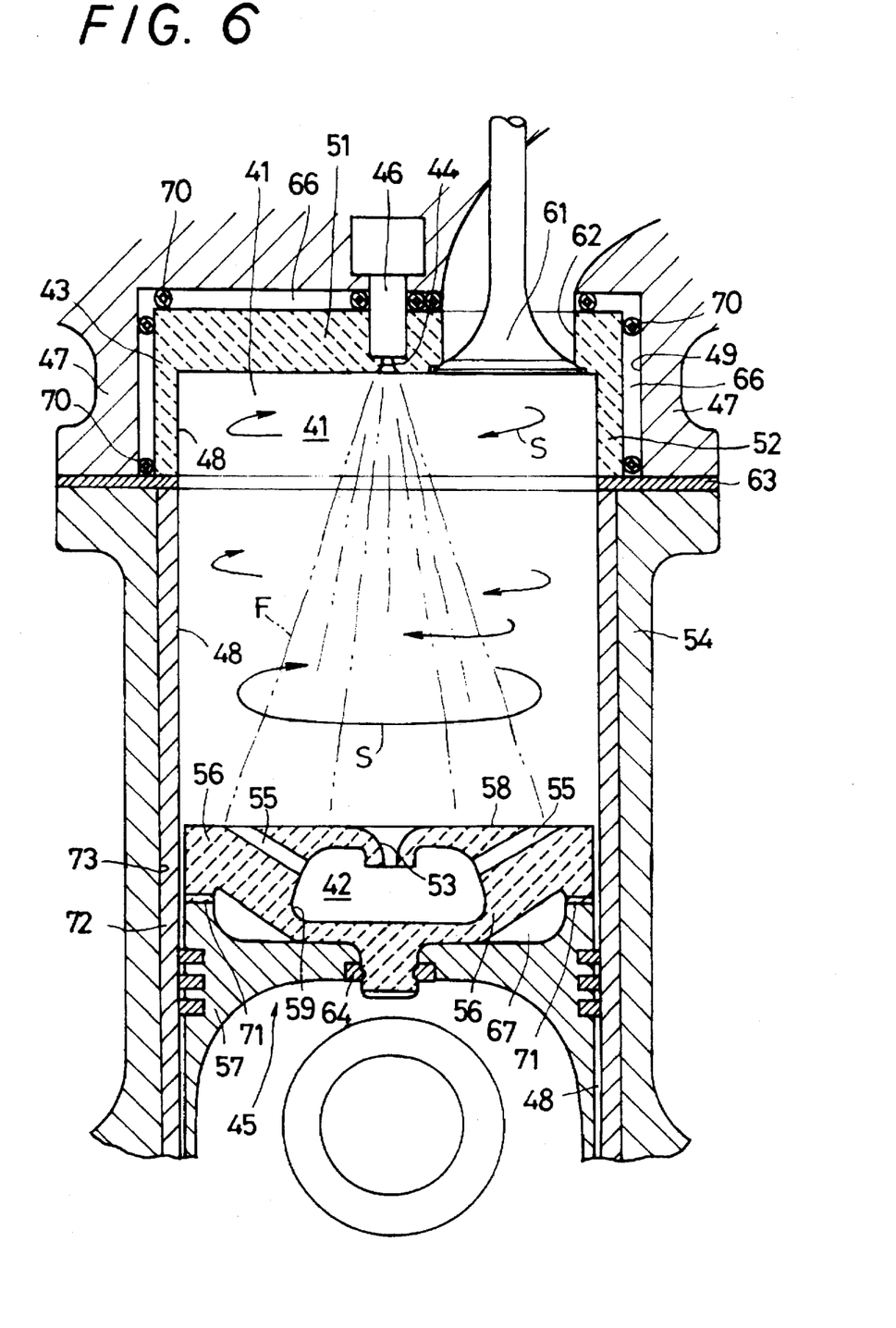
FIG. 6 is a sectional view showing the condition, in which the piston is in the vicinity of a bottom dead center, of the diesel engine using a low evaporativity fuel of FIG. 4.

In this diesel engine using a low evaporativity fuel and constructed as described above, the suction air introduced, when the suction valve 61 is opened, from the suction ports 62, 65 into the interior of the cylinder 48 flows so as to have a swirl, i.e. an air flow S in the cylinder 48 as shown in FIG. 6. In the first half of a compression stroke which is immediately after the completion of a suction stroke, the atomized fuel F from the fuel injection nozzle 46 is injected in a conically and widely into the air flows S in the cylinder 48 so that the low evaporativity fuel is dispersed into the air flow S, in the initial stage of a compression stroke in which the piston is in the vicinity of a bottom dead center. In the compression stroke, the piston 45 is moved up, and the air in the cylinder is compressed to cause the temperature of the air to increase. Consequently, the gasification of the fuel is promoted, and the fuel in the air flow is dispersed thereinto substantially uniformly to form a gaseous mixture, which is substantially uniform in the whole of the interior of the cylinder 48. In accordance with the upward movement of the piston in the compression stroke, the gaseous mixture in the cylinder 48 enters the swirl chamber 42 through the communication ports 55 and fuel injection port 53, and the mixing thereof is promoted in the swirl chamber 42. An ignition fuel is then injected from the fuel injection nozzle 46 into the swirl chamber 42 through the fuel injection port 53 at the terminal end of the compression stroke, and ignited and burnt therein.

Figure 4:
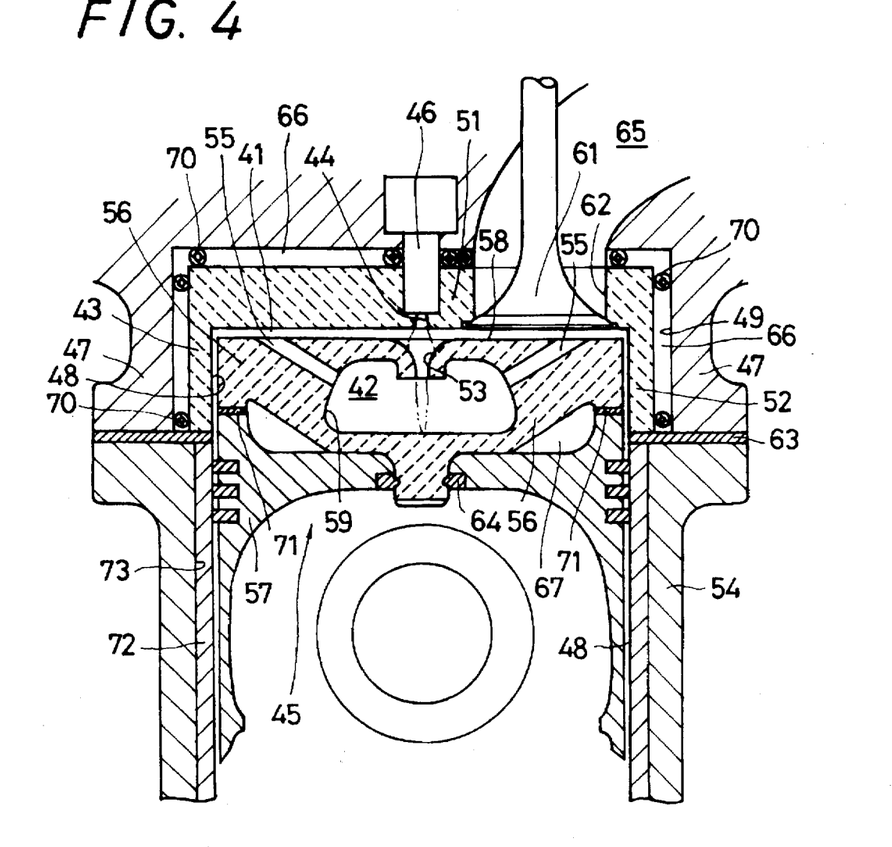
FIG. 4 is a sectional view showing the condition, in which a piston is in a top dead center, of a second embodiment of the diesel engine using a low evaporativity fuel according to the present invention.
Figure 5:
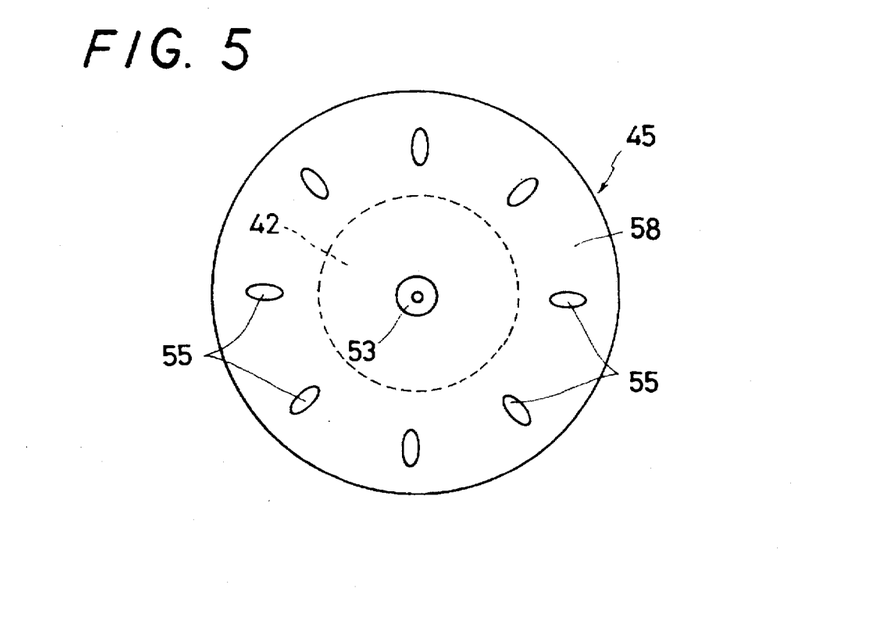
FIG. 5 is a plan view showing an upper surface of the piston in the diesel engine using a low evaporativity fuel of FIG. 4.

During this time, the fuel injected from the fuel injection nozzle 46 is temporarily put in a diffused state as shown in FIG. 4, and collected immediately thereafter through a condensation passage as it receives heat from the wall surface, the fuel being then injected into the swirl chamber 42 to turn into a rich gaseous mixture suitable to be ignited, which is then ignited and burnt. The uniform gaseous mixture in the swirl chamber 42 catches the flames, and the flames propagate to burn the gaseous mixture at a stroke. The stroke of the piston is then shifted to an expansion stroke, and the flames are ejected from the swirl chamber 42 toward the periphery of the cylinder of the primary chamber 41 through the communication ports 55 to burn the lean gaseous mixture in the primary chamber 41 at a stroke. Thus, the secondary combustion is completed in a short period of time, and the thermal efficiency is improved with the generation of soot and $NO_x$ minimized.

Figure 7:
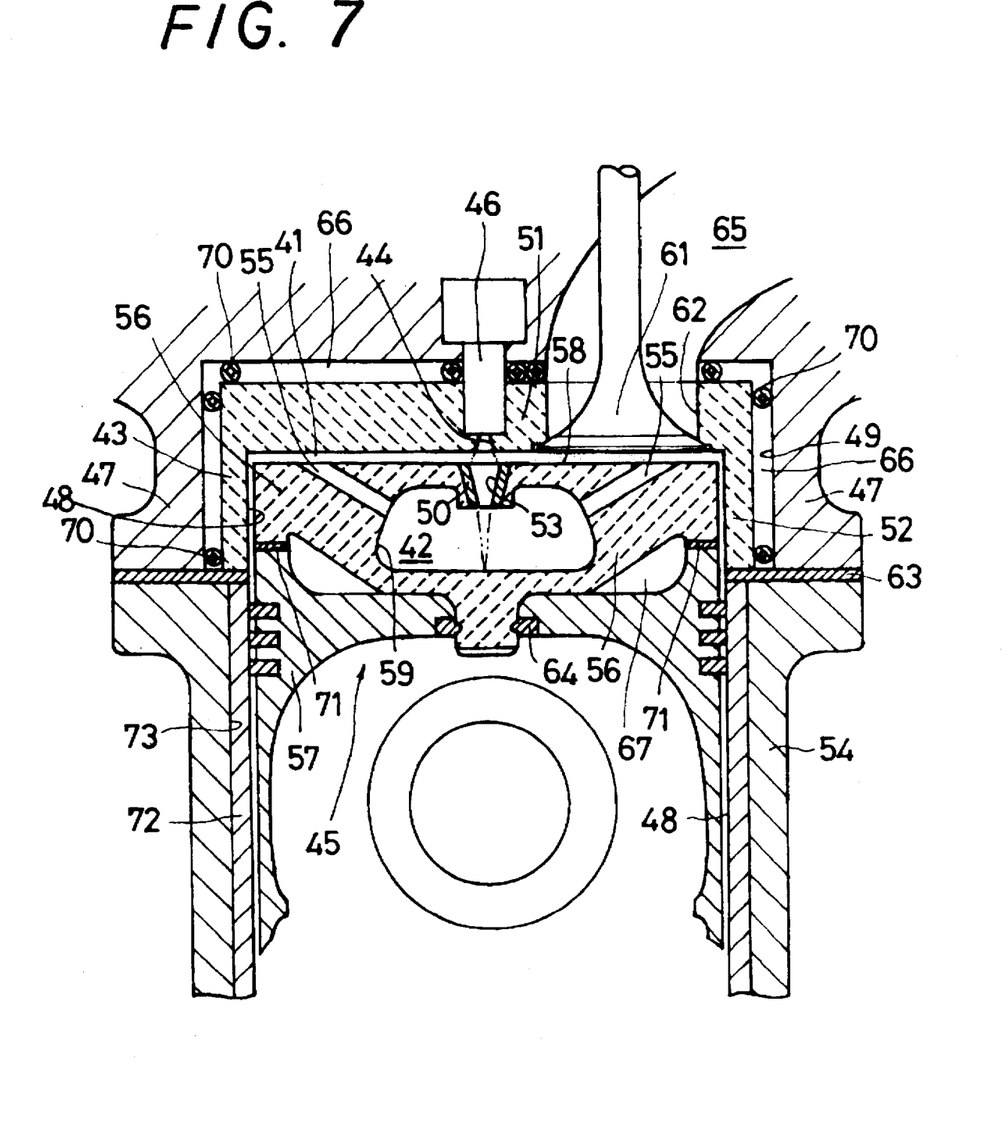
FIG. 7 is a sectional view showing the condition, in which a piston is in a top dead center, of a third embodiment of the diesel engine using a low evaporativity fuel according to the present invention.

A third embodiment of the diesel engine using a low evaporativity fuel according to the present invention will now be described with reference to FIG. 7. Since the third embodiment has the same construction and function as compared with the above-described embodiments except that the construction of a fuel injection port 53 formed in a piston 45 is different, the same parts are designated by the same reference numerals, and the duplication of descriptions thereof is omitted. The wall surface of the fuel injection port 53 formed in the piston 45 is provided with an ignition promoting catalyst layer 50 of platinum (Pt), nickel (Ni) or cesium (Cs). Accordingly, a low evaporativity fuel brought into contact with the ignition promoting catalyst layer 50 on the wall surface of the fuel injection port 53 and supplied to a swirl chamber 42 is activated, and put in an easily ignitable condition even when the temperature is low at which the engine is partially loaded. Therefore, the fuel is ignited and burnt reliably, and a misfire can be prevented.

What is claimed is:

1. A diesel engine using a low evaporativity fuel, comprising a cylinder head fixed on a cylinder block constituting a cylinder, a combustion chamber structure forming a heat insulating primary chamber provided in a cavity formed in said cylinder head, valves adapted to open and close suction and exhaust ports formed in said cylinder head, a fuel injection nozzle adapted to inject a low evaporativity fuel into said cylinder provided in said cylinder head, a glow plug provided in said cylinder head, a piston adapted to be moved reciprocatingly in said cylinder, forming a heat insulating swirl chamber therein and provided with communication ports through which said primary chamber and said swirl chamber communicate with each other, and a plug insert bore through which said glow plug is thrusted into said swirl chamber when said piston is in the vicinity of a top dead center, and a controller adapted to control the injection of a fire resistant low evaporativity fuel from said fuel injection nozzle into said primary chamber in the first half of a compression stroke and the injection of a part of said fuel into said swirl chamber at an end of the compression stroke in which said glow plug is thrusted into said swirl chamber through said plug insert bore, whereby the fuel is ignited and burnt in said swirl chamber.

2. A diesel engine according to claim 1, wherein the suction air introduced from said suction port into said cylinder forms a swirl therein.

3. A diesel engine according to claim 1, wherein the injection of said fuel atomized from said fuel injection nozzle into said cylinder is done diagonally from the center of said cylinder toward the periphery thereof, said fuel being dispersed into an outer circumferential portion of a swirl formed in said cylinder.

4. A diesel engine according to claim 1, wherein said controller is adapted to control the injection of an ignition fuel from said fuel injection nozzle into said swirl chamber through a fuel injection port formed in said piston, in the second half of said compression stroke in response to a partial load condition of said diesel engine.

5. A diesel engine using a low evaporativity fuel, comprising a cylinder head fixed on a cylinder block constituting a cylinder, a combustion chamber structure forming a heat insulating primary chamber provided in a cavity formed in said cylinder head, valves adapted to open and close suction and exhaust ports formed in said cylinder head, a piston moved reciprocatingly in said cylinder and provided therein with a swirl chamber of a heat insulating structure, communication ports communicating said primary chamber and said swirl chamber with each other and formed in said piston in a circumferentially spaced manner, a fuel injection port formed in the substantially central portion of said piston so that a cross-sectional area of said fuel injection port decreases gradually from a top surface of said piston toward said swirl chamber, and a fuel injection nozzle provided in said cylinder head and adapted to inject a low evaporativity fuel in a diffused state into said cylinder in the first half of a compression stroke, and an ignition low evaporativity fuel into said swirl chamber through said fuel injection port in the second half of said compression stroke.

6. A diesel engine according to claim 5, therein said fuel injection port is provided on a wall surface thereof with an ignition promoting catalyst layer of Pt, Ni or Cs.

7. A diesel engine according to claim 5, wherein the suction air introduced from said suction port into said cylinder forms a swirl therein.

8. A diesel engine according to claim 5, wherein the fuel not less than 50% of a total amount of which is injected from said fuel injection nozzle into said cylinder at the beginning of a compression stroke, is injected in a diffused state from the center of said cylinder toward a periphery of a top surface of said piston, the remaining atomized ignition fuel injected at the terminal end of said compression stroke being collected in said fuel injection port, receiving heat from the wall surface of said fuel injection port and being injected into said swirl chamber.

9. A diesel engine according to claim 5, wherein said engine is applied to an installed type cogeneration engine.

* * * * *